(12) United States Patent
Boeke et al.

(10) Patent No.: US 10,107,107 B2
(45) Date of Patent: Oct. 23, 2018

(54) GAS TURBINE ENGINE COMPONENT WITH DISCHARGE SLOT HAVING OVAL GEOMETRY

(75) Inventors: Mark A. Boeke, Plainville, CT (US); Edwin Otero, Southington, CT (US); Jeffrey J. DeGray, Hampden, MA (US); Tracy A. Propheter-Hinckley, Manchester, CT (US); Guillermo J. Fernandez, San Juan, PR (US); Sarah Riley, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1619 days.

(21) Appl. No.: 13/598,988

(22) Filed: Aug. 30, 2012

(65) Prior Publication Data
US 2014/0000262 A1    Jan. 2, 2014

Related U.S. Application Data

(60) Provisional application No. 61/665,499, filed on Jun. 28, 2012.

(51) Int. Cl.
F01D 5/18 (2006.01)
F01D 9/06 (2006.01)

(52) U.S. Cl.
CPC ............. *F01D 5/187* (2013.01); *F01D 9/065* (2013.01); *F05D 2240/121* (2013.01); *F05D 2240/122* (2013.01); *F05D 2240/303* (2013.01); *F05D 2240/304* (2013.01); *F05D 2240/81* (2013.01); *F05D 2250/14* (2013.01)

(58) Field of Classification Search
CPC ... F01D 9/02; F01D 5/14; F01D 5/147; F01D 5/186; F01D 5/187; F05D 2240/304; F05D 2250/14
See application file for complete search history.

(56) References Cited

U.S. PATENT DOCUMENTS

| | | | |
|---|---|---|---|
| 4,128,928 A | 12/1978 | Shotts et al. |
| 4,601,638 A | 7/1986 | Hill et al. |
| 4,664,597 A | 5/1987 | Auxier et al. |
| 5,458,461 A | 10/1995 | Lee et al. |
| 6,287,075 B1 | 9/2001 | Kercher |
| 6,746,209 B2 | 6/2004 | DeMarche et al. |
| 7,300,250 B2 | 11/2007 | Papple |

(Continued)

FOREIGN PATENT DOCUMENTS

| | | |
|---|---|---|
| WO | 2011113805 | 9/2011 |
| WO | 2014011276 A2 | 1/2014 |

OTHER PUBLICATIONS

International Search Report and Written Opinion for PCT Application No. PCT/US2013/046733 dated Mar. 27, 2014.

(Continued)

*Primary Examiner* — Igor Kershteyn
*Assistant Examiner* — Jason Fountain
(74) *Attorney, Agent, or Firm* — Carlson, Gaskey & Olds

(57) ABSTRACT

A component for a gas turbine engine according to an exemplary aspect of the present disclosure includes, among other things, an body portion that extends between a leading edge and a trailing edge. At least one of the leading edge and the trailing edge includes at least one discharge slot having a first portion that includes an oval geometry.

22 Claims, 3 Drawing Sheets

(56) References Cited

U.S. PATENT DOCUMENTS

| | | | |
|---|---|---|---|
| 7,766,615 | B2 | 8/2010 | Spangler et al. |
| 8,047,787 | B1* | 11/2011 | Liang .......................... 416/97 R |
| 8,807,943 | B1* | 8/2014 | Liang .......................... 416/97 R |
| 8,827,647 | B1* | 9/2014 | Liang .......................... 416/97 R |
| 2001/0016163 | A1 | 8/2001 | Tomita et al. |
| 2003/0044276 | A1 | 3/2003 | Leeke et al. |
| 2003/0138322 | A1 | 7/2003 | Boury et al. |
| 2005/0095129 | A1 | 5/2005 | Benjamin et al. |
| 2009/0317258 | A1* | 12/2009 | Tibbott et al. .............. 416/97 R |
| 2010/0034662 | A1* | 2/2010 | Jendrix et al. .............. 416/97 R |
| 2010/0119377 | A1 | 5/2010 | Tibbott et al. |
| 2012/0076654 | A1 | 3/2012 | Maldonado et al. |
| 2013/0302177 | A1* | 11/2013 | Bergholz et al. ........... 416/97 R |
| 2014/0037429 | A1* | 2/2014 | Okita ........................... 415/115 |

OTHER PUBLICATIONS

International Preliminary Report on Patentability for PCT Application No. PCT/US2013/046733 dated Jan. 8, 2015.
Extended European Search Report for Application No. EP 13 83 6277 dated Apr. 7, 2015.

* cited by examiner

GAS TURBINE ENGINE COMPONENT WITH DISCHARGE SLOT HAVING OVAL GEOMETRY

CROSS-REFERENCE TO RELATED APPLICATION

This application claims priority to U.S. Provisional Application No. 61/665,499, which was filed on Jun. 28, 2012.

BACKGROUND

This disclosure relates to a gas turbine engine, and more particularly to a gas turbine engine component having at least one discharge slot.

Gas turbine engines typically include a compressor section, a combustor section and a turbine section. In general, during operation, air is pressurized in the compressor section and mixed with fuel and burned in the combustor section to generate hot combustion gases. The hot combustion gases flow through the turbine section, which extracts energy from the hot combustion gases to power the compressor section and other gas turbine engine loads.

The compressor and turbine sections of the gas turbine engine typically include alternating rows of rotating blades and stationary vanes. The rotating blades extract the energy from the hot combustion gases that are communicated through the gas turbine engine, and the vanes convert the velocity of the airflow into pressure and prepare the airflow for the next set of blades. The hot combustion gases are communicated over airfoils of the blades and vanes. The airfoils can include internal cooling circuits that receive airflow to cool the airfoils during engine operation. The cooling circuits may include discharge slots that discharge the cooling airflow from the airfoils.

SUMMARY

A component for a gas turbine engine according to an exemplary aspect of the present disclosure includes, among other things, a body portion that extends between a leading edge and a trailing edge. At least one of the leading edge and the trailing edge includes at least one discharge slot having a first portion that includes an oval geometry.

In a further non-limiting embodiment of the foregoing component, the airfoil is one of a vane and a blade.

In a further non-limiting embodiment of any of the foregoing components, the at least one discharge slot is disposed at the trailing edge of the body portion.

In a further non-limiting embodiment of any of the foregoing components, the at least one discharge slot is disposed at the leading edge of the body portion.

In a further non-limiting embodiment of any of the foregoing components, another discharge slot is disposed through at least one of a suction side and a pressure side of the body portion.

In a further non-limiting embodiment of any of the foregoing components, the first portion of the at least one discharge slot is elliptical shaped.

In a further non-limiting embodiment of any of the foregoing components, the at least one discharge slot includes a second portion having a racetrack shape.

In a further non-limiting embodiment of any of the foregoing components, the at least one discharge slot includes a shape that is a union between the racetrack shape and the oval geometry.

In a further non-limiting embodiment of any of the foregoing components, the at least one discharge slot includes a second portion having an elliptical shape.

In a further non-limiting embodiment of any of the foregoing components, the at least one discharge slot includes a shape that is a union between the elliptical shape and the oval geometry.

In a further non-limiting embodiment of any of the foregoing components, the first portion of the at least one discharge slot is positioned immediately adjacent to a platform of the component, or is positioned on the platform.

A gas turbine engine according to an exemplary aspect of the present disclosure includes, among other things, a compressor section, a combustor section in fluid communication with the compressor section along a core flow path and a turbine section in fluid communication with the combustor section along the core flow path. An component extends into the core flow path within at least one of the compressor section and the turbine section. The component includes a body portion that extends between a leading edge and a trailing edge. At least one of the leading edge and the trailing edge includes at least one discharge slot having a first portion that includes an oval geometry.

In a further non-limiting embodiment of the foregoing gas turbine engine, the oval geometry is elliptical shaped.

In a further non-limiting embodiment of either of the foregoing gas turbine engines, the at least one discharge slot includes a second portion having a racetrack shape.

In a further non-limiting embodiment of any of the foregoing gas turbine engines, the at least one discharge slot includes a shape that is a union between the racetrack shape and the oval geometry.

In a further non-limiting embodiment of either of the foregoing gas turbine engines, the at least one discharge slot includes a second portion having an elliptical shape.

In a further non-limiting embodiment of any of the foregoing gas turbine engines, the at least one discharge slot includes a shape that is a union between the elliptical shape and the oval geometry.

In a further non-limiting embodiment of any of the foregoing gas turbine engines, a second discharge slot is adjacent to the at least one discharge slot. The second discharge slot is shaped differently from the at least one discharge slot.

In a further non-limiting embodiment of any of the foregoing gas turbine engines, the first portion of the at least one discharge slot is positioned immediately adjacent to a platform of the component.

In a further non-limiting embodiment of any of the foregoing gas turbine engines, the first portion of the at least one discharge slot is positioned at a fillet that connects the body portion to the platform.

The various features and advantages of this disclosure will become apparent to those skilled in the art from the following detailed description. The drawings that accompany the detailed description can be briefly described as follows.

DETAILED DESCRIPTION

Figure 1:
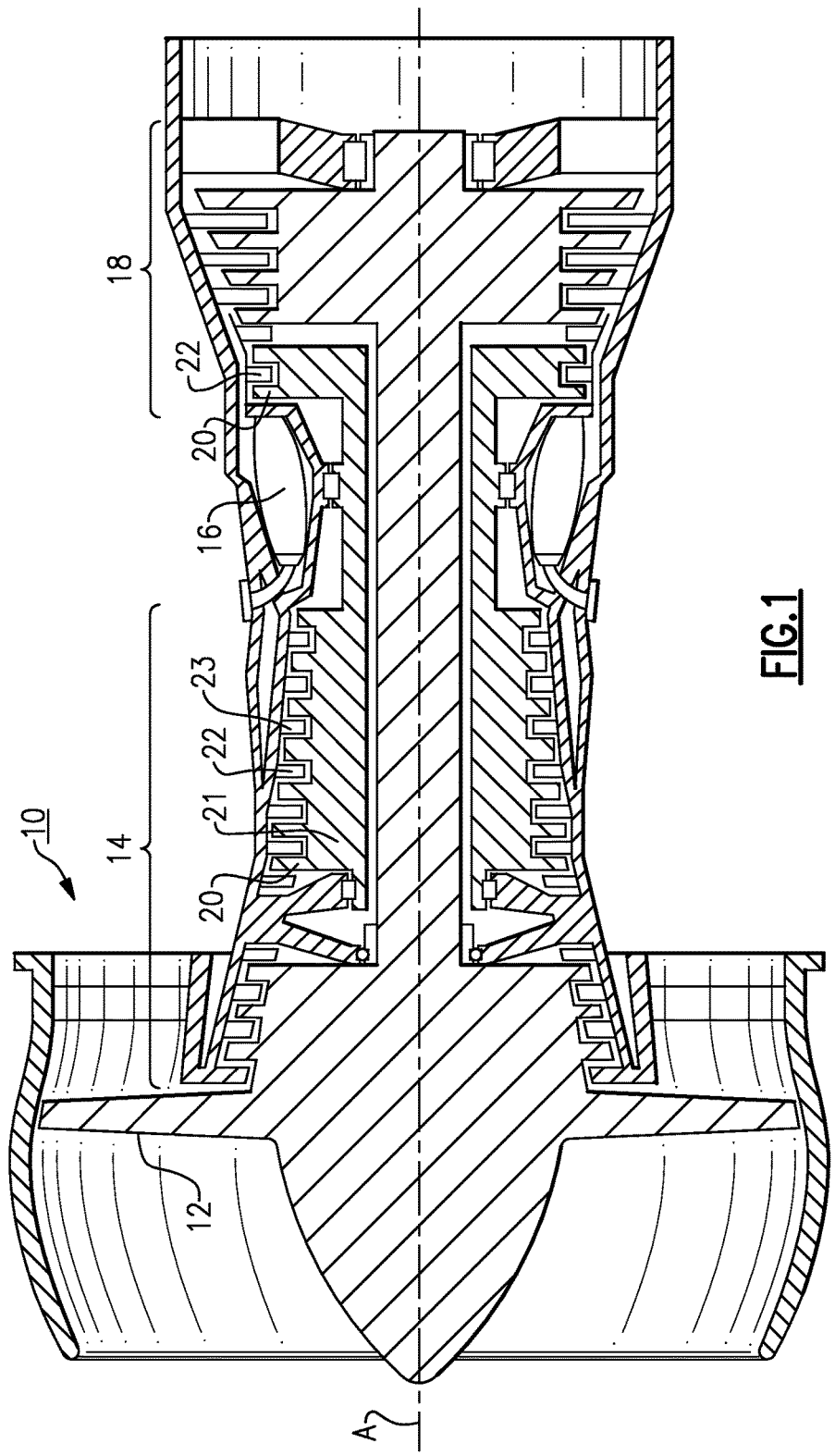
FIG. 1 schematically illustrates a gas turbine engine.

FIG. 1 illustrates an example gas turbine engine 10 that is circumferentially disposed about an engine centerline axis A. The gas turbine engine 10 includes (in serial flow communication) a fan section 12, a compressor section 14, a combustor section 16 and a turbine section 18. During operation, air is compressed in the compressor section 14 and is mixed with fuel and burned in the combustor section 16. The combustion gases from the combustor section 16 are discharged through the turbine section 18, which extracts energy from the combustion gases for powering the compressor section 14, the fan section 12, and other gas turbine engine loads.

The compressor section 14 and the turbine section 18 may include alternating rows of rotor assemblies 21 and vane assemblies 23. The rotor assemblies 21 include a plurality of rotating blades 20, while each vane assembly 23 includes a plurality of stator vanes 22. The blades 20 of the rotor assemblies 21 create or extract energy (in the form of pressure) from the airflow that is communicated through the gas turbine engine 10. The vanes 22 direct airflow to the blades 20 to either add or extract energy.

Various components of the gas turbine engine 10, including airfoils such as the blades 20 and vanes 22 of the compressor section 14 and the turbine section 18, may be subjected to repetitive thermal cycling under widely ranging temperatures and pressures. The hardware of the turbine section 18 is particularly subjected to relatively extreme operating conditions. Therefore, some components may require internal cooling circuits for cooling the parts during engine operation. Example cooling circuits that include trailing edge discharge slots for cooling these components are discussed below.

This view is highly schematic and is included to provide a basic understanding of a gas turbine engine and not to limit the disclosure. This disclosure extends to all types of gas turbine engines and for all types of applications.

Figure 2:
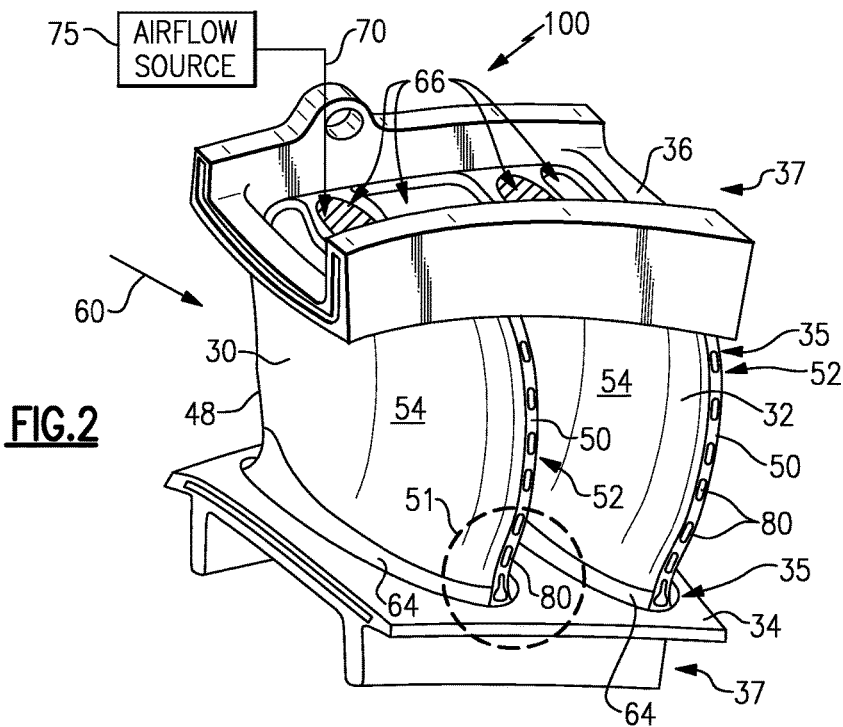
FIG. 2 illustrates a component that can be incorporated into a gas turbine engine.

FIG. 2 illustrates an exemplary component 100 that can be incorporated into a gas turbine engine, such as the gas turbine engine 10. In this embodiment, the component 100 is represented as a vane doublet of the turbine section 18. However, the component 100 can be incorporated into other sections of a gas turbine engine 10, including but not limited to, the compressor section 14, and is not necessarily limited to vane doublets. For example, this disclosure could extend to vane singlets or other vane assemblies, or to any other airfoil, including the blades 20 and vanes 22 of the compressor section 14 and the turbine section 18. This disclosure could also extend to non-airfoil components, such as blade outer air seals (BOAS), or any other components that extend into the core flow path of the gas turbine engine 10.

The exemplary component 100 includes a first body portion 30 and a second body portion 32 that is adjacent to the first body portion 30. In this embodiment, the body portions 30, 32 are airfoils. The component 100 could include only a single body portion or multiple body portions. The body portions 30, 32 extend in span between an inner platform 34 (on an inner diameter side) and an outer platform 36 (on an outer diameter side). Both the inner platform 34 and the outer platform 36 include a gas path side 35 and a non-gas path side 37 (i.e., the side secluded from the gas path 60).

Each body portion 30, 32 included a leading edge 48, a trailing edge 50, a pressure side 52 and a suction side 54. The body portions 30, 32 extend in chord between the leading edge 48 and the trailing edge 50.

A gas path 60 is communicated axially downstream through the gas turbine engine 10 in a direction that extends from the leading edge 48 toward the trailing edge 50 of the body portions 30, 32. The gas path 60 (for the communication of core airflow along a core flow path) extends between the gas path sides 35 associated with each of the inner platform 34 and the outer platform 36. The gas path sides 35 of the inner platform 34 and the outer platform 36 are connected to the body portions 30, 32 via fillets 64.

The component 100 can include an internal circuit 66 that receives a cooling airflow 70 from an airflow source 75 that is external to the component 100. Although depicted at the outer platform 36, the airflow source 75 could also communicate the cooling airflow 70 at the inner platform 34. The cooling airflow 70 is at a lower temperature than the airflow of the gas path 60 that is communicated across the body portions 30, 32. In one embodiment, the cooling airflow 70 is a bleed airflow that can be sourced from the compressor section 14 or any other portion of the gas turbine engine 10 that is at a higher pressure and lower temperature than the component 100. The cooling airflow 70 is circulated through the internal circuit 66 to transfer thermal energy from the component 100 to the cooling airflow 70, thereby cooling portions of the component 100. As is further discussed below, the trailing edge 50 can include one or more discharge slots 80 that are in fluid communication with the internal circuit 66 for discharging the cooling airflow 70 from the body portions 30, 32.

Figures 3, 4:
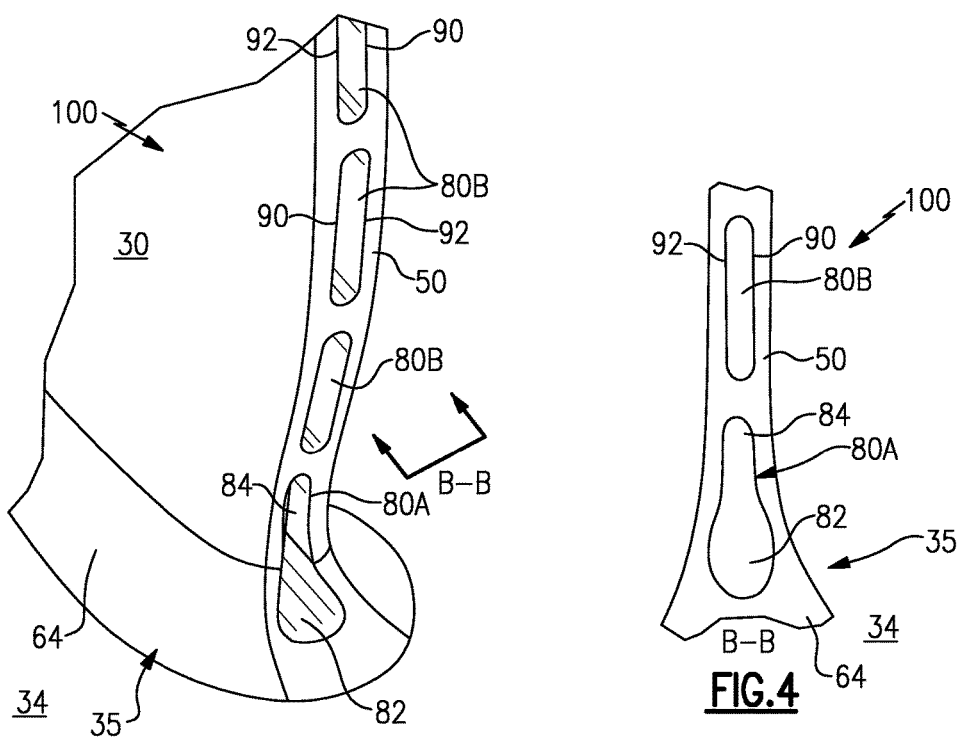
FIG. 3 illustrates a magnified view of Section 51 of the component of FIG. 2.
FIG. 4 illustrates a cross-sectional view through section B-B of FIG. 3.

FIGS. 3 and 4 illustrate a trailing edge 50 of a body portion 30. The trailing edge 50 includes a plurality of discharge slots 80 for discharging the cooling airflow 70 from the component 100. In this disclosure, the term "slot" is intended to denote any type of opening. Also, although depicted with respect to the trailing edge 50, it should be understood that one or more of the plurality of discharge slots 80 could be positioned at other locations of the body portion 30, including but not limited to, the leading edge 48, the pressure side 52, the suction side 54, the inner platform 34 and/or the outer platform 36.

Figure 5:
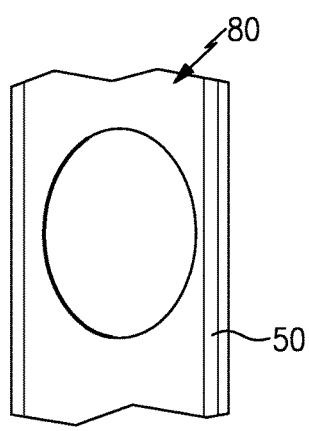
FIGS. 5 and 6 illustrate exemplary discharge slots that can be incorporated into a component.
Figure 6:
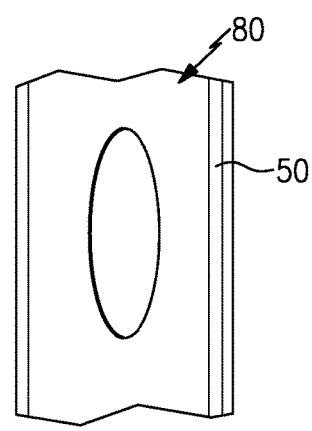

The plurality of discharge slots 80 can embody a variety of shapes and configurations. For example, any of the plurality of discharge slots 80 could include a pure oval shape (i.e., no straight portions, see FIG. 5), an elliptical shape (See FIG. 6), a racetrack shape (i.e., includes two flat sides 90, 92, see discharges slots 80B of FIGS. 3 and 4) or a combination of racetrack shaped and oval shaped (See discharge slots 80A of FIGS. 3 and 4). In this disclosure, an elliptical shape is one type of oval shape that the discharge slots 80 may embody.

In the exemplary embodiment of FIGS. 3 and 4, at least one of the plurality of discharge slots 80 can include a first portion 82 having an oval geometry. The first portion 82 can be elliptical shaped, in one embodiment. The discharge slot 80A that is closest to the gas path sides 35 of the inner platform 34 and the outer platform 36 can include the first portion 82 having the oval geometry (See FIG. 2). In this embodiment, the first portion 82 is positioned at the fillet 64 of the inner platform 34. In another embodiment, the first portion 82 is positioned on the inner platform 34.

The discharge slot 80A can further include a second portion 84 connected to the first portion 82 that includes the racetrack shape. In other words, the discharge slot 80A includes a shape that is a union between a racetrack shape and an oval shape. The first portion (oval geometry) 82 creates a larger fillet at the trailing edge 50 at a position closest to the gas path sides 35 of the inner platform 34 and the outer platform 36 through which the stresses associated with the trailing edge 50 can be distributed.

The additional discharge slots 80B of the trailing edge 50 can include racetrack shapes, in one embodiment. It should be understood that any combination, configuration, size or shape of discharge slots 80 may be incorporated into the component 100.

Although the different examples include specific components that are shown in the illustrations, embodiments of this disclosure are not limited to those particular combinations. It is possible to use some of the components or features from one of the examples and combination of features or components from another one of the examples. As one non-limiting example, the racetrack shape of the second portion 84 of the discharge slot 80A could be replaced with the elliptical shape from FIG. 6.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A component for a gas turbine engine, comprising:
a body portion that extends between a leading edge and a trailing edge, wherein at least one of said leading edge and said trailing edge includes at least one discharge slot having a first portion that includes an oval geometry and a second portion having a different geometry than said first portion.

2. The component as recited in claim 1, wherein said component is one of a vane and a blade.

3. The component as recited in claim 1, wherein said at least one discharge slot is disposed at said trailing edge of said body portion.

4. The component as recited in claim 1, wherein said at least one discharge slot is disposed at said leading edge of said body portion.

5. The component as recited in claim 1, comprising another discharge slot disposed through at least one of a suction side and a pressure side of said body portion.

6. The component as recited in claim 1, wherein said first portion of said at least one discharge slot is elliptical shaped.

7. The component as recited in claim 1, wherein said second portion includes a racetrack shape.

8. The component as recited in claim 7, wherein said at least one discharge slot includes a shape that is a union between said racetrack shape and said oval geometry.

9. The component as recited in claim 1, wherein said second portion includes an elliptical shape.

10. The component as recited in claim 9, wherein said at least one discharge slot includes a shape that is a union between said elliptical shape and said oval geometry.

11. The component as recited in claim 1, wherein said first portion of said at least one discharge slot is positioned at a position that is one of immediately adjacent to a platform of said component and on said platform.

12. A gas turbine engine, comprising:
a compressor section;
a combustor section in fluid communication with said compressor section along a core flow path;
a turbine section in fluid communication with said combustor section along said core flow path;
a component that extends into said core flow path within at least one of said compressor section and said turbine section, wherein said component includes a body portion that extends between a leading edge and a trailing edge; and
wherein at least one of said leading edge and said trailing edge includes at least one discharge slot having a first portion that includes an oval geometry and a second portion having a different geometry than said first portion.

13. The gas turbine engine as recited in claim 12, wherein said second portion includes a racetrack shape.

14. The gas turbine engine as recited in claim 13, wherein said at least one discharge slot includes a shape that is a union between said racetrack shape and said oval geometry.

15. The gas turbine engine as recited in claim 12, wherein said second portion includes an elliptical shape.

16. The gas turbine engine as recited in claim 15, wherein said at least one discharge slot includes a shape that is a union between said elliptical shape and said oval geometry.

17. The gas turbine engine as recited in claim 12, comprising a second discharge slot adjacent to said at least one discharge slot, wherein said second discharge slot is shaped differently from said at least one discharge slot.

18. The gas turbine engine as recited in claim 12, wherein said first portion of said at least one discharge slot is positioned immediately adjacent to a platform of said component.

19. The gas turbine engine as recited in claim 18, wherein said first portion of said at least one discharge slot is positioned at a fillet that connects said body portion to said platform.

20. The component as recited in claim 1, wherein said first portion extends across a first radial distance of said at least one discharge slot and said second portion extends across a second radial distance of said at least one discharge slot.

21. The gas turbine engine as recited in claim 12, wherein said oval geometry is elliptical shaped.

22. A component for a gas turbine engine, comprising:
a platform;
a body portion that extends from said platform and extends between a leading edge and a trailing edge;
a first discharge slot formed in at least one of said leading edge and said trailing edge, said first discharge slot including a first portion that includes an oval geometry, said first portion positioned at a fillet that connects said body portion to said platform; and
a second discharge slot adjacent to said first discharge slot and shaped differently from said first discharge slot.

* * * * *